United States Patent
Onishi et al.

(10) Patent No.: US 10,873,894 B2
(45) Date of Patent: Dec. 22, 2020

(54) WIRELESS COMMUNICATION DEVICE AND COMMUNICATION METHOD

(71) Applicant: TOYOTA JIDOSHA KABUSHIKI KAISHA, Toyota (JP)

(72) Inventors: Ryokichi Onishi, Tokyo (JP); Makiko Matsumoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 15/516,303

(22) PCT Filed: Aug. 31, 2015

(86) PCT No.: PCT/JP2015/004410
§ 371 (c)(1),
(2) Date: Mar. 31, 2017

(87) PCT Pub. No.: WO2016/056166
PCT Pub. Date: Apr. 14, 2016

(65) Prior Publication Data
US 2017/0245197 A1    Aug. 24, 2017

(30) Foreign Application Priority Data

Oct. 9, 2014    (JP) .................................. 2014-207926

(51) Int. Cl.
*H04W 40/18*    (2009.01)
*H04W 4/46*    (2018.01)
(Continued)

(52) U.S. Cl.
CPC ............. *H04W 40/18* (2013.01); *H04W 4/46* (2018.02); *H04W 40/02* (2013.01);
(Continued)

(58) Field of Classification Search
CPC ..... H04W 40/18; H04W 76/14; H04W 4/046; H04W 40/02; H04W 40/026; H04W 40/20; H04W 64/006
(Continued)

(56) References Cited

U.S. PATENT DOCUMENTS 9,491,792 B2 * 11/2016 Yao ........................ H04W 76/14
2013/0273907 A1 * 10/2013 Vikberg ................ H04W 48/02
                                                                455/426.1

(Continued)

FOREIGN PATENT DOCUMENTS

JP    2004-340864 A    12/2004
JP    2005-227181 A    8/2005
(Continued)

OTHER PUBLICATIONS

Sou et al., "A Probabilistic Approach for V2V Relay Contention based on Channel State Information," 2013 IEEE Wireless Communications and Networking Conference (WCNC), 2013. pp. 505-509.

*Primary Examiner* — Peter P Chau
(74) *Attorney, Agent, or Firm* — Oliff PLC (57) ABSTRACT

A wireless communication device has: wireless communication unit; calculation unit for calculating an evaluation value based on an opportunity for communication with the access providing device; transmission unit for transmitting the evaluation value to the other wireless communication device; acquisition unit for acquiring an evaluation value for the other wireless communication device; and communication control unit. When the other wireless communication device has more opportunities for communication than the wireless communication device does, the communication control unit preferably transmits uplink information, but when the other wireless communication device has less opportunity for communication than the wireless commu- (Continued)

nication device does, the communication control unit preferably transmits downlink information.

11 Claims, 8 Drawing Sheets

(51) Int. Cl.
  *H04W 40/20* (2009.01)
  *H04W 40/02* (2009.01)
  *H04W 76/14* (2018.01)
  *H04W 64/00* (2009.01)
  *H04W 4/029* (2018.01)
  *H04W 4/024* (2018.01)
  *H04W 84/12* (2009.01)

(52) U.S. Cl.
  CPC ......... *H04W 40/026* (2013.01); *H04W 40/20* (2013.01); *H04W 64/006* (2013.01); *H04W 76/14* (2018.02); *H04W 4/024* (2018.02); *H04W 4/029* (2018.02); *H04W 84/12* (2013.01)

(58) Field of Classification Search
  USPC .......................................... 370/329
  See application file for complete search history.

(56) References Cited

U.S. PATENT DOCUMENTS

| | | | | |
|---|---|---|---|---|
| 2014/0220936 A1* | 8/2014 | Turtinen | ............... | H04W 76/14 455/411 |
| 2014/0349659 A1* | 11/2014 | Ishii | ...................... | H04W 76/10 455/444 |
| 2014/0376533 A1* | 12/2014 | Tohzaka | ............... | H04J 3/0664 370/338 |
| 2015/0117414 A1* | 4/2015 | Tang | ..................... | H04W 36/08 370/332 |
| 2015/0264554 A1* | 9/2015 | Addepalli | ............ | H04W 4/046 370/328 |
| 2015/0296019 A1 | 10/2015 | Onishi et al. | | |

FOREIGN PATENT DOCUMENTS

| | | |
|---|---|---|
| JP | 2006-025274 A | 1/2006 |
| JP | 2009-118351 A | 5/2009 |
| JP | 2013-066126 A | 4/2013 |
| JP | 2014-096630 A | 5/2014 |
| JP | 2016-025463 A | 2/2016 |
| WO | 2016/009651 A1 | 1/2016 |

* cited by examiner

WIRELESS COMMUNICATION DEVICE AND COMMUNICATION METHOD

TECHNICAL FIELD

The present invention relates to a communication method employed in a wireless communication system.

BACKGROUND ART

Wireless communication systems for collecting information acquired by various devices by means of wireless communications and utilizing the collected information have been widely used in recent years. For example, there is known a probe car system for acquiring information such as the driving conditions of cars from various sensors equipped in the vehicles. The use of vehicle-to-vehicle communications has been taken into consideration as well in order to facilitate the distribution of inter-vehicle information in the probe car system. For instance, when transmitting information from vehicles to a probe center, information acquired by the vehicles is propagated between the vehicles through the use of vehicle-to-vehicle communications, and a vehicle that is able to access a wireless LAN spot (access point) transmits the information to the probe center. When, on the other hand, delivering information from the probe center to a vehicle, the vehicle that is able to access the wireless LAN spot receives the information from the probe center and propagates the information to another vehicle through the use of vehicle-to-vehicle communication.

It is desirable to realize efficient vehicle-to-vehicle communications in the limited bandwidths and opportunities for vehicle-to-vehicle communications. For instance, while it is not efficient to transmit information directed to the probe center, to a vehicle that is unlikely to access the wireless LAN spot, it is efficient to transmit the information to a vehicle that is highly likely to access the wireless LAN spot. On the other hand, it is efficient to transmit information delivered from the probe center, to a vehicle that is unlikely to access the wireless LAN spot.

The following prior arts are examples of a communication method that takes into consideration accessing a wireless LAN spot in a vehicle communication system.

PTL 1 discloses a technique for increasing the opportunities to communicate with a wireless LAN spot by understanding the position of the wireless LAN spot and searching for a movement path passing through the vicinity of the wireless LAN. This method can increase the opportunities for vehicles to communicate with one another through the wireless LAN spot.

PTL 2 discloses a technique for acquiring, as communication paths to a destination station, in wireless ad-hoc communication including a plurality of wireless terminals and a plurality of wireless LAN spots, a path extending through a wireless network and a path extending through both a wireless network and a relay network (wired network), and comparing the numbers of relays between the wireless networks of the paths to determine which path to employ. An efficient path can be determined by comparing the numbers of relays specifically between the wireless networks instead of simply comparing the numbers of relays.

Moreover, the following prior art exists as a wireless communication method. PTL 3 discloses a technique for calculating the amount of transmittable data for each available frequency channel from data to be exchanged between transmitting/receiving nodes, and implement channel allocation in view of the calculated amount of transmittable data. This method can execute efficient channel allocation in view of the past and future communication opportunities.

PTL 4 is a technique of wireless ad-hoc communication in which a center server manages wireless terminals in groups and a wireless LAN identifier (EESID) is allocated to each group so that the terminals can perform communication with one another using the ESSIDs allocated thereto. This method can change the connection by dynamically changing the ESSIDs.

CITATION LIST

Patent Literature

[PTL 1] Japanese Patent Application Publication No. 2004-340864
[PTL 2] Japanese Patent Application Publication No. 2006-025274
[PTL 3] Japanese Patent Application Publication No. 2013-066126
[PTL 4] Japanese Patent Application Publication No. 2005-227181
[PTL 5] Japanese Patent Application Publication No. 2009-118351

SUMMARY OF INVENTION

Technical Problem

The problem with the method disclosed in PTL 1 is that it deteriorates the movement efficiency, although the opportunities for communication with the wireless LAN spot increase.

The method disclosed in PTL 2 can determine a communication path in view of the number of relays to the wireless LAN spot. However, the session needs to be constructed between the ends when determining a communication path, and the relay station needs to be connected to the wireless LAN spot when data are transmitted. Therefore, although this method functions effectively in an environment where the wireless communication devices do not move much, the method is not effective in an highly mobile environment such as a vehicle network system.

The method disclosed in PTL 3 is capable of improving the communication opportunities in view of the past and future opportunities communication. However, PTL 3 is a method for realizing efficient allocation of communication channels, which cannot optimize the communication paths.

The method disclosed in PTL 4 is capable of changing the connection by dynamically changing the wireless LAN identifiers. However, this method cannot optimize the communication paths.

A flooding method such as the one described in PTL 2 exists as a method for optimizing the communication paths in view of the opportunities for communication with a wireless LAN spot. This method, however, requires a complicated procedure for determining a communication path by executing a flooding process. Furthermore, when a terminal moves a long distance, the once-determined path cannot be used again, creating the need to establish a path by executing a flooding process at each communication. The problem with such a method is that the communication efficiency cannot be improved in an environment where the mobile terminal moves frequently.

An object of the present invention is to provide a technique capable of realizing efficient communications with simple processes in view of the opportunities for communication with an access providing device such as a wireless LAN spot.

Solution to Problem

In order to achieve this object, a first aspect of the present invention is a wireless communication device, having:
- a wireless communication unit configured to perform wireless communication with an access providing device providing access to a predetermined device and with another wireless communication device;
- an evaluation value calculation unit configured to calculate a first evaluation value, the first evaluation value being an evaluation value based on an opportunity for communication between a wireless communication device and the access providing device; an evaluation value transmission unit configured to transmit the first evaluation value calculated by the evaluation value calculation unit, to the other wireless communication device;
- an evaluation value acquisition unit configured to acquire a second evaluation value, the second evaluation value being an evaluation value for the other wireless communication device; and
- a communication control unit configured to control communication between the wireless communication device and the other wireless communication device, based on a comparison between the first evaluation value and the second evaluation value.

The foregoing configuration can understand the level of the opportunity for communicating with the access providing device based on a comparison between the evaluation values, thereby optimizing the communication in accordance with the level of the opportunity for communication. The wireless communication device can perform communication control by simply acquiring the evaluation value of the immediate communication partner (the other wireless communication device), as well as simple processes without the need to acquire evaluation values of devices that are two or more hops away.

In the present invention, it is preferred that, when determination is made based on the comparison between the first evaluation value and the second evaluation value that the other wireless communication device has more opportunities to communicate with the access providing device than the wireless communication device does, the communication control unit implements control such that information directed to the predetermined device is sent to the other wireless communication device.

By transmitting information directed to the predetermined device to the wireless communication device having more opportunities to communicate with the access providing device than the wireless communication device, the possibility that the information reaches the predetermined device can be increased, thereby realizing efficient communications.

In the present invention, it is preferred that, when determination is made based on the comparison between the first evaluation value and the second evaluation value that the wireless communication device has more opportunities to communicate with the access providing device than the other wireless communication device does, the communication control unit implements control such that information, delivered from the predetermined device, is sent to the other wireless communication device.

As described above, the information delivered from the predetermined device is transmitted to the wireless communication device that has less opportunity to communicate with the access providing device than the wireless communication device. Therefore, the delivered information can be transmitted efficiently to the wireless communication device that is unlikely to obtain an opportunity to communicate with the predetermined device.

The evaluation value according to the present invention can be calculated based on at least a communicable time at which the wireless communication device was able to communicate with the access providing device, the number of communications with the access providing device, or the amount of communication data, in a past predetermined time period. The communicable time indicates, for example, a time at which the wireless communication device is able to communicate with the access providing device, and can be obtained as a time period during which the wireless communication device receives a control signal such as a beacon from the access providing device (the difference between a time at which the wireless communication device receives a control signal for the first time and a time at which the wireless communication device receives a control signal last), or a time period during which the wireless communication device is connected to the access providing device. The number of communications indicates the number of times the wireless communication device communicates with the access providing device, and can be obtained as the number of times the wireless communication device is connected to the access providing device or the number of times the wireless communication device receives a control signal such as a beacon from the access providing device. The amount of communication data indicates the amount of data exchanged between the wireless communication device and the access providing device. Note that the communicable time, the number of communications, and the amount of communication data between the wireless communication device and the predetermined device may be used as the communicable time, the number of communications, and the amount of communication data between the wireless communication device and the access providing device.

Preferably, for example, the higher the level of the opportunity for communication, the higher the evaluation value is. However, the relation between the opportunity for communication and the evaluation values does not have to be linear, and may be in a relation in log scale or in any correspondence relation of monotonic increase (weakly increase or non-decrease).

The past predetermined time period can be any time period, such as the past one hour, past three hours, past six hours, past twelve hours, past twenty-four hours, previous day, past one week, past two weeks, and past four weeks.

It is also preferred that the evaluation value be calculated based on a value that represents the opportunity for communication in the past predetermined time period in an area corresponding to the current location of the wireless communication device. Because there is a possibility that the opportunity for communication with the access providing device fluctuates depending on the area, the use of the evaluation value representing the opportunity for communication in the area corresponding to the current location enables the execution of more adequate communication control. The area corresponding to the current location of the wireless communication device may be a place that has the same geographical attribute as the current location. A geographical range (an area ID), a section of an urban area/ suburban area/rural area, a section of a freeway/open road, or the like can be employed as the geographical attribute.

It is also preferred that the evaluation value be calculated based on a value representing the opportunity for communication in a future predetermined time period. The opportunity for communication of the future predetermined time period can be estimated based on a scheduled movement path of the wireless communication device. In this manner, communication control can be executed in view of the future communication opportunity in place of the past communication opportunity. Note that the evaluation value may be calculated based on both the past communication opportunity and the future communication opportunity.

In the present invention, the evaluation value transmission unit can incorporate the evaluation value into a control frame that notifies surroundings of the presence of the wireless communication device. For instance, if the wireless communication system between the wireless communication device and the other wireless communication device is a wireless LAN, the evaluation value transmission unit can incorporate the evaluation value into an ESSID of a beacon. In addition, if the wireless communication system between the wireless communication device and the other wireless communication device is a system compliant to the Hotspot 2.0 standard, the evaluation value can be included in an operator friendly name of an ANQP Response and transmitted. Even in communication systems other than a wireless LAN such as Bluetooth™, Zigbee™, cellular communications, and WiMax, the evaluation value can be included in a similar control frame and transmitted.

In the present invention, when determination is made based on the comparison between the first evaluation value and the second evaluation value that the other wireless communication device has more opportunities to communicate with the access providing device than the wireless communication device does, and when the wireless communication device retains information directed to the predetermined device, it is preferred that the communication control unit establish a wireless connection to the other wireless communication device and implement control such that the information to be transmitted to the predetermined device is sent to the other wireless communication device.

Because a wireless connection to the other wireless communication device is established only when determination is made based on the evaluation value included in a control frame such as a beacon that the communication is necessary, a wireless connection is not established when the communication is not necessary.

In the present invention, it is preferred that the wireless communication system of communication between the wireless communication device and the other wireless communication device be a wireless LAN, and when determination is made based on the comparison between the evaluation values that the wireless communication device has more opportunities to communicate with the access providing device than the other wireless communication device does, it is preferred that the communication control unit functions as an access point. When determination is made based on the comparison between the evaluation values that the wireless communication device has less opportunity to communicate with the access providing device than the other wireless communication device does, it is preferred that the communication control unit functions as a station.

Note that the present invention can be taken as a wireless communication device having means for executing at least part of the processes or as a wireless communication system configured with this wireless communication device. The present invention can also be taken as a wireless communication method for executing at least part of the processes. The present invention can also be taken as a computer program for causing a computer to execute this method or as a computer readable storage medium in which the computer program is stored non-transitory. The foregoing means and processes can be combined as much as possible to configure the present invention.

Advantageous Effects of Invention

The present invention can realize efficient communication with simple processes in view of opportunities for communication with the access providing device such as a wireless LAN spot.

DESCRIPTION OF EMBODIMENTS

First Embodiment

<System Overview>

Figure 1:
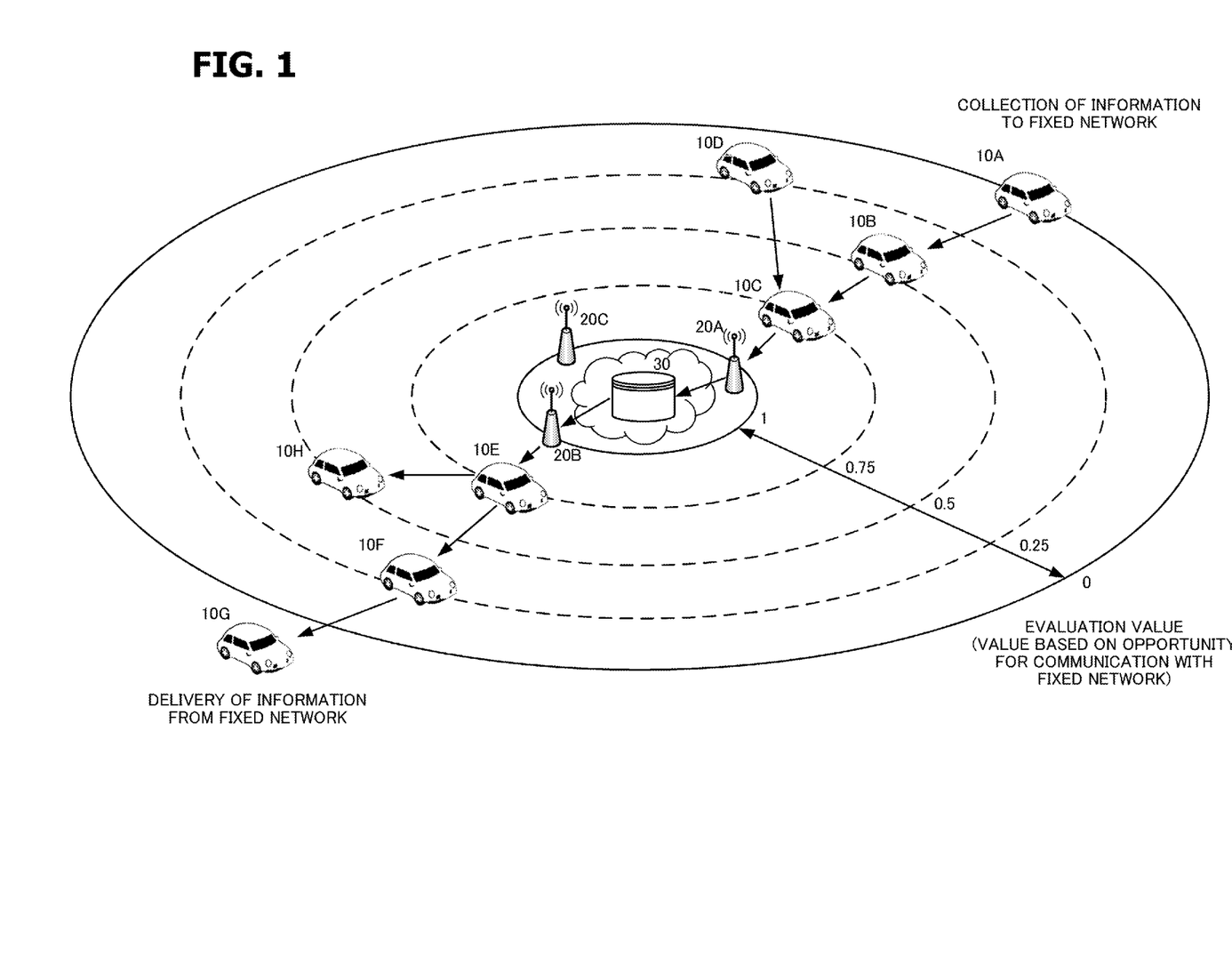
FIG. 1 is a conceptual diagram showing a wireless communication system according to an embodiment.

FIG. 1 is a conceptual diagram of a wireless communication system according to an embodiment. The wireless communication system is configured with a plurality of vehicles 10A to 10H (generically called "vehicle 10" unless otherwise distinguished), a plurality of wireless LAN spots 20A to 20C (generically called "wireless LAN spot 20" unless otherwise distinguished), and a database server 30 (simply called "server 30"). The vehicle 10 is capable communicating wirelessly with the wireless LAN spot 20 and another vehicle 10. The wireless LAN spot 20 is capable of communicating with the database server 30 via a fixed network such as the Internet, and provides the vehicle 10, connected wirelessly to the wireless LAN spot 20, with access to the database server 30.

The positions of these devices in FIG. 1 are not physical positions but are based on the levels of opportunities for communication with the server 30. In other words, in FIG. 1, the devices having more opportunities to communicate with the server 30 are shown in the middle and the devices having less opportunity to communicate with the server 30 are shown on the periphery.

In this wireless communication system, information collected by the vehicle 10 (sensor information, etc.) is aggregated in the server 30, and the information acquired by the server 30 (the aggregated sensor information, etc.) is delivered to the vehicle 10. In so doing, the vehicle 10 can transmit/receive the information to/from the server 30 as long as the vehicle 10 can communicate with the wireless LAN spot 20. The information is also exchanged between the vehicles 10 by direct communication between the vehicles.

First, information to be transmitted from a vehicle 10 to the server 30 (also called "uplink information") is considered. When the uplink information is transmitted by means of vehicle-to-vehicle communication, it is preferred that the uplink information be transmitted to a vehicle that has more opportunities to communicate with the server 30 than the transmitting vehicle does. For example, when the uplink information is transmitted from the vehicle 10B to another vehicle through vehicle-to-vehicle communication, it is preferred that the information be transmitted to the vehicle 10C that has more opportunities to communicate with the server 30 than the vehicle 10B does. This is because if the vehicle having more opportunities for communication retains the information, there is a higher possibility that the information reach the server 30.

Furthermore, when the information to be delivered from the server 30 to a vehicle 10 (also called "downlink information") is transmitted by vehicle-to-vehicle communication, it is preferred that the information be transmitted to a vehicle that has less opportunity to communicate with the server 30 than the transmitting vehicle does. For instance, when the downlink information is transmitted from the vehicle 10F to another vehicle by vehicle-to-vehicle communication, it is preferred that the information be transmitted to the vehicle 10G that has less opportunity to communicate with the server 30 than the vehicle 10F does. This is because there is little possibility that a vehicle with less opportunity for communication can receive the downlink information directly from the server 30.

In the present embodiment, as described above, an opportunity of each of the vehicles to communicate with the database server 30 is calculated, so that the uplink information is transmitted from a vehicle having less opportunity to communicate with the server 30 preferentially toward a vehicle having more opportunities to communicate with the same, and that the downlink information is transmitted from a vehicle having more opportunities to communicate with the server 30 preferentially toward a vehicle having less opportunity to communicate with the same. In this manner, necessary information can preferentially be transmitted even in a short communication time, realizing efficient communications.

<Configurations>

Configurations of the vehicles 10, wireless LAN spots 20, and database server 30 are described hereinafter.

The vehicle 10 has an in-vehicle terminal configured with an arithmetic processing device, a main storage device, an auxiliary storage device, an input/output device, a wireless communication device, and the like. The in-vehicle terminal of the vehicle 10 has two wireless communication interfaces. Both of the wireless communication interfaces execute communications complaint to a wireless LAN (IEEE 802.11 series) communication system. One of the interfaces functions as a wireless LAN client (written as "station" or "STA"), while the other interface functions as a wireless LAN access point (written as "AP"). The vehicle 10 has various sensors (e.g., a sensor that acquires the speed and location of the vehicle, as well as the condition inside the vehicle). Sensor information items obtained from the sensors are delivered to a wireless communication terminal and transmitted to another vehicle or the server.

Figure 2:
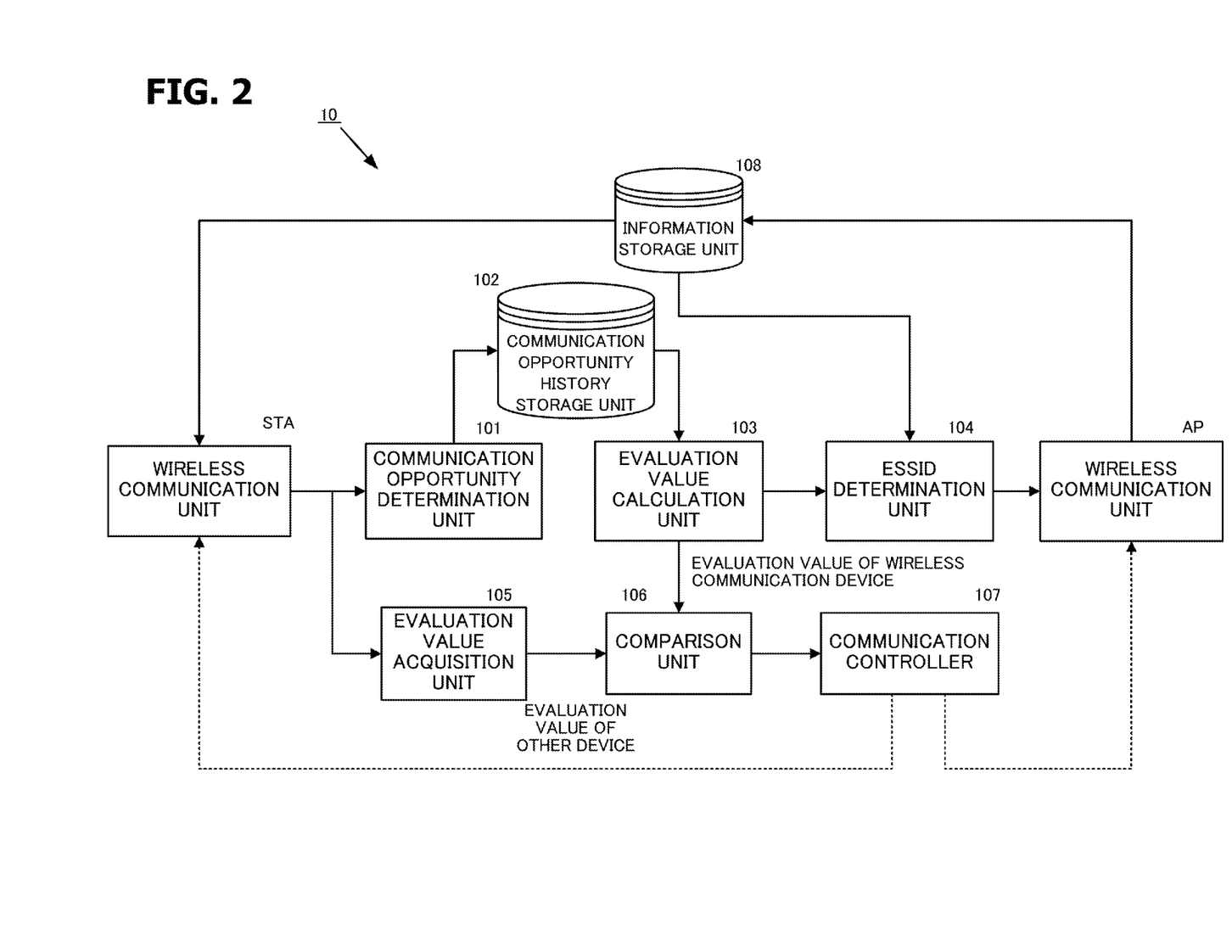
FIG. 2 is a functional block diagram of in-vehicle terminals configuring the wireless communication system according to the embodiment.

The wireless communication terminal of the vehicle 10 provides each of the functions shown in FIG. 2 by causing the arithmetic processing unit such as a CPU to read and execute a program. In other words, the vehicle 10 realizes each of the functional parts such as a communication opportunity determination unit 101, a communication opportunity history storage unit 102, an evaluation value calculation unit 103, an ESSID determination unit 104, an evaluation value acquisition unit 105, a comparison unit 106, a communication controller 107, an information storage unit 108, a wireless communication unit STA, and a wireless communication unit AP.

The wireless communication unit STA is a functional part that communicates, as a wireless LAN client, with the wireless LAN access points such as the wireless LAN spot 20 and the wireless communication unit AP of another vehicle. The wireless communication unit STA detects the presence of an access point by receiving a beacon from the access point, and performs a process for establishing a wireless connection to the detected access point. In the process for establishing a wireless connection to the access point, an authentication process is performed as necessary. In the present embodiment, the wireless LAN spot 20 has a predetermined ESSID (Extended Service Set ID), and the wireless communication unit AP of each vehicle determines an ESSID based on the predetermined naming rules set forth later. Thus, the wireless communication unit STA can determine, based on the ESSID included in the beacon, whether the access point is the wireless LAN spot 20 or vehicle 10.

The wireless communication unit AP is a functional part that communicates, as a wireless LAN access point, with the wireless communication unit STA of another vehicle. The wireless communication unit AP uses an ESSID determined by the ESSID determination unit 104.

Information that is transmitted/received in the wireless communication system according to the present embodiment is stored in the information storage unit 108. For example, sensor information measured by a host vehicle, information received from the server 30, information received from another vehicle, and the like, are stored. In addition to the entity of information itself, the information transmission sources, the dates and times of creation of the information, the last dates and times the information is transmitted, and attribute information indicating whether the information is uplink information or downlink information, are stored, in the information storage unit 108, in association with the information. Note that the uplink information is the information to be transmitted (directed) to the database server 30, whereas the downlink information is the information delivered from the database server 30.

The details of the processes executed by the other functional parts are described hereinafter in detail with reference to the flowcharts.

The wireless LAN spot 20 is a wireless communication device (the access providing device), which, as a wireless LAN access point, provides a wireless connection. The wireless LAN spot 20 is capable of communicating with the database server 30 via a fixed network such as the Internet or a private network, and provides a device connected as a wireless LAN client (vehicle 10) with access to the database server 30. As described above, the wireless LAN spot 20 uses the predetermined ESSID. The plurality of wireless LAN spots 20 may share one ESSID or use different ESSIDs.

The database server 30 is a general computer (an information processing device) that collects the sensor information from the vehicle 10 via the wireless LAN spot 20 to perform a statistical process on the collected sensor information, and delivers the processed information as delivery information to the vehicle 10. Note that the types of information collected from the vehicle 10 by the server 30 or the details of the statistical process are not particularly limited in the present embodiment. The delivery information for the vehicle 10 does not have to be based on the collected sensor information.

<Details of Processes>

(1. Communication Opportunity Measuring Process)

Figure 3:
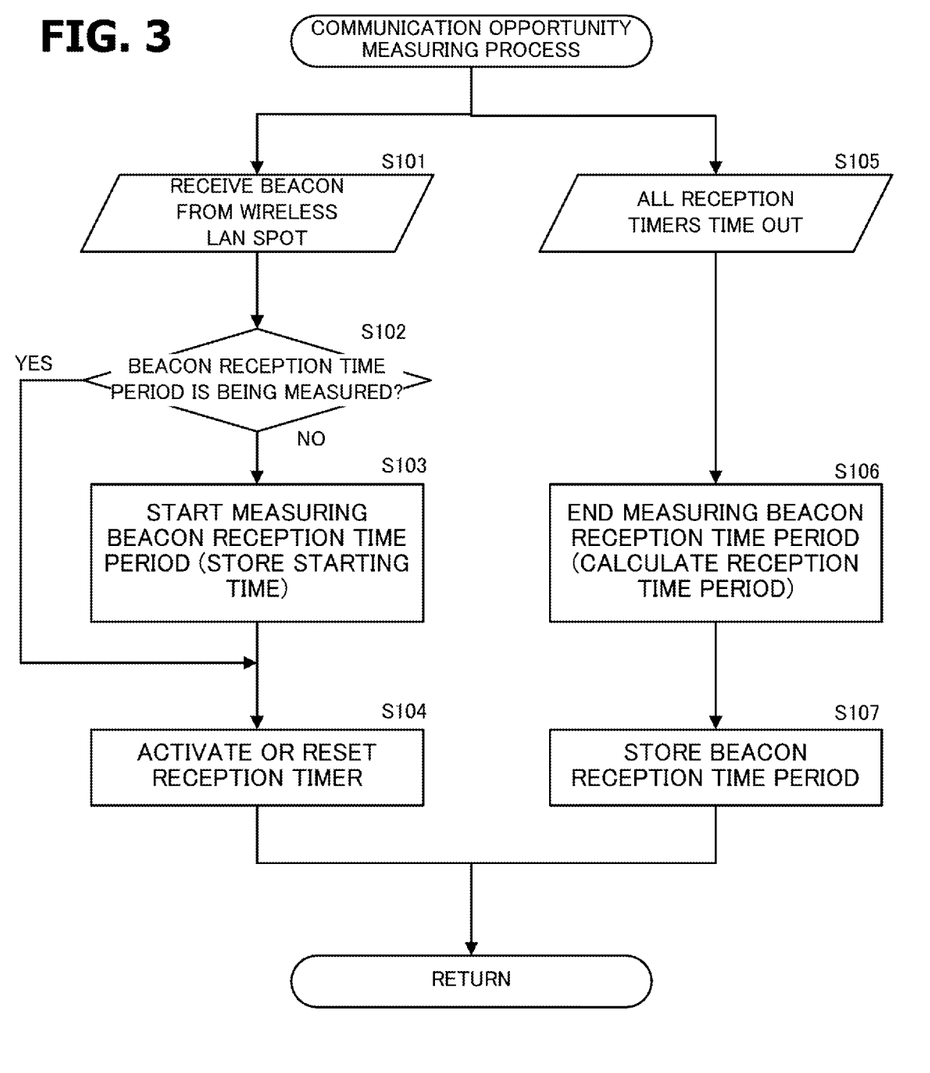
FIG. 3 is a flowchart showing a flow of a communication opportunity measuring process according to the embodiment.

A communication opportunity measuring process executed by the communication opportunity determination unit 101 is described with reference to the flowchart shown in FIG. 3. An opportunity for communication between the vehicle 10 and the database server 30 can be represented by an opportunity for communication between the vehicle 10 and the wireless LAN spot 20, as described above. In the present embodiment, therefore, a time period in which the wireless communication unit STA can communicate with the wireless LAN spot 20 can be measured as the communication opportunity.

When the wireless communication unit STA receives a beacon from the wireless LAN spot 20 (S101), the communication opportunity determination unit 101 executes steps S102 to S104. Whether the received beacon belongs to the wireless LAN spot 20 or not can be determined by determining whether the ESSID included in the beacon is a predetermined ESSID or not.

In step S102, it is determined whether a reception time period is being measured or not with respect to a wireless LAN spot which is the source of transmission of the received beacon. Note that, because the beacon includes the MAC address of the wireless LAN spot, even when a plurality of wireless LAN spots share one ESSID, it can be determined which one of the wireless LAN spots has transmitted the beacon.

When the reception time period is not being measured (S102—NO), in step S103 the current time is stored as a beacon reception starting time, and measurement of a beacon reception time period is started. Then, a reception timer is activated in step S104. Because this reception timer is a timer for determining whether the beacon can continuously be received from the wireless LAN spot 20 or not, a timeout value is set to, for example, approximately 3 seconds (30 times the beacon interval). Also, when beacons can be received from the plurality of wireless LAN spots, individual reception timers are activated with respect to the respective wireless LAN spots.

When it is determined in step S102 that the reception time period is being measured (S102—YES), the process proceeds to step S104 to reset the activated reception timer.

An event is generated when the activated reception timer times out. When all the reception timers time out (S105), the process proceeds to step S106 in which the communication opportunity determination unit 101 ends the measurement of the beacon reception time period. Specifically, the communication opportunity determination unit 101 calculates a time interval between the current time, which is a beacon reception ending time, and the reception starting time stored in step S103, as the beacon reception time period (communicable time). Then, in step S107, the communication opportunity determination unit 101 stores the beacon reception time period (one or both of the reception starting time and the reception ending time) in the communication opportunity history storage unit 102.

Figure 4:
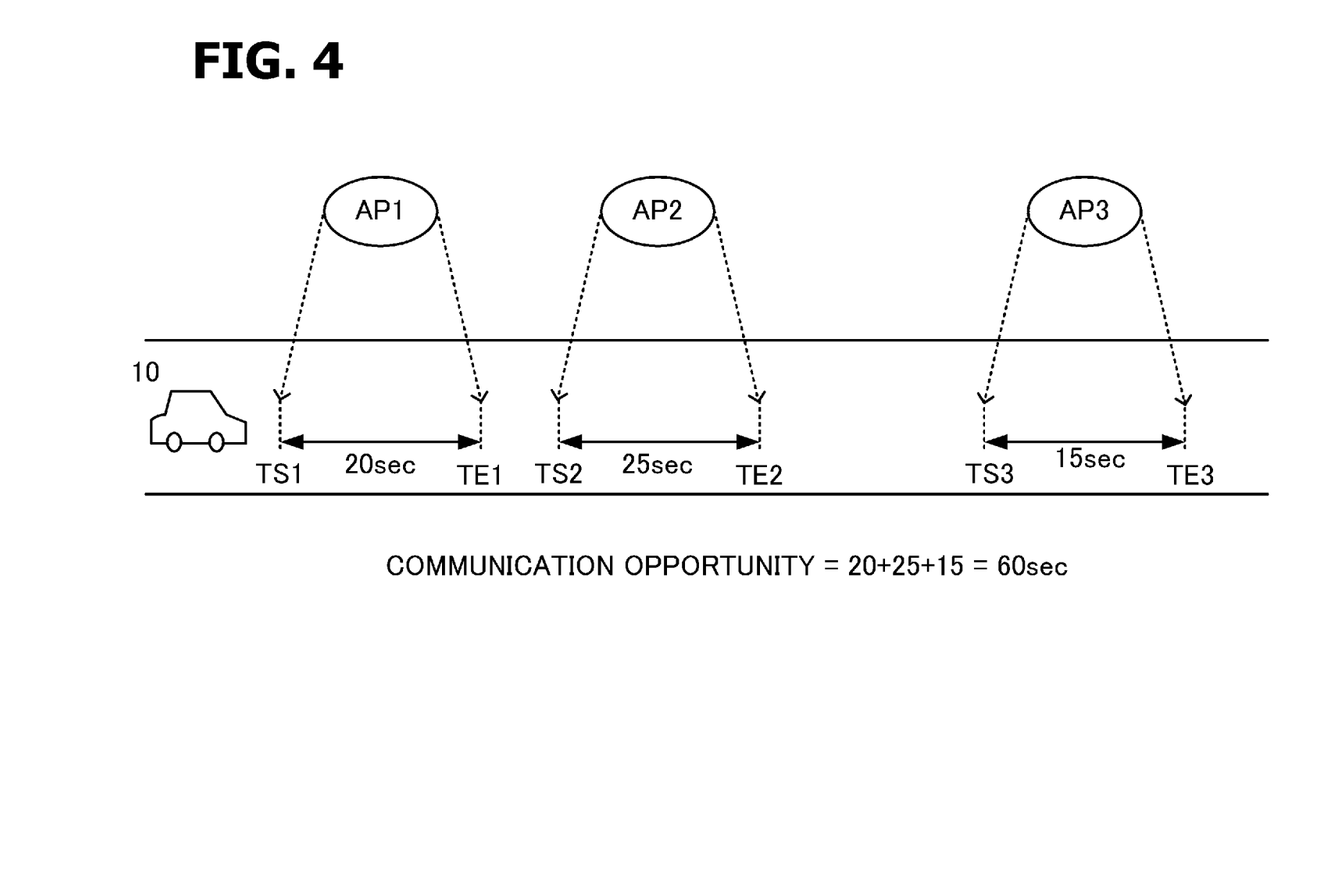
FIG. 4 is a diagram for explaining a communication opportunity.

Through such a process, the time at which a vehicle receives a beacon from the wireless LAN spot 20 during travel can be measured. In the example shown in FIG. 4, the vehicle 10 is able to communicate with the three wireless LAN spots 20 of AP1 to AP3 while traveling, so that beacon reception starting times TS1 to TS3 and beacon reception ending times TE1 to TE3 can be acquired, and a time between each reception starting time and each reception ending time is calculated as the reception time period.

(2. Evaluation Value Calculation Process and ESSID Determination Processes)

An evaluation value calculation process executed by the evaluation value calculation unit 103 and an ESSID determination process executed by the ESSID determination unit 104 are described hereinafter with reference to the flowchart shown in FIG. 5(A).

In step S201, the evaluation value calculation unit 103 refers to the communication opportunity history storage unit 102 to calculate a total of beacon reception time periods within a predetermined time period in the immediate past, as well as a ratio of the total time period to the entire time period. The duration of the predetermined time period may be any length as long as a beacon reception opportunity within this time period is expected to be the average. The predetermined time period can be any time period, such as the past one hour, past three hours, past six hours, past twelve hours, past twenty-four hours, previous day, past one week, past two weeks, and past four weeks. The present embodiment assumes that the predetermined time period is the past three hours.

In step S202, the evaluation value calculation unit 103 calculates an evaluation value from the ratio of the reception time period calculated in step S201. Here, the evaluation value is a value between 0 and 1, and the greater the ratio of the reception time period, the greater the evaluation value is determined to be. For instance, as shown in FIG. 5(B), the evaluation value can be determined from the reception time period ratio based on a logarithmic relationship. A function or a look-up table may be used in order to obtain the evaluation value from the reception time period ratio. Furthermore, the evaluation value may be determined by, for example, taking the same value for a plurality of reception time period ratios, as long as the evaluation value is a (weakly) monotonically increasing function of the reception time period ratio.

In step S203, the ESSID determination unit 104 determines an attribute of the information stored in the information storage unit 108 (retained information). In the present embodiment, whether the downlink information is retained or the uplink information is retained is employed as the attribute of the retained information.

In step S204, the ESSID determination unit 104 determines an ESSID used by the wireless communication unit AP based on the evaluation value calculated by the evaluation value calculation unit 103 and the attribute of the retained information. In the present embodiment, the ESSID determination unit 104 determines the ESSID by adding a character string indicating the evaluation value, a character string indicating the presence of the downlink information, and a character string indicating the presence of the uplink information to a fixed character string. As the fixed character string, "T-VEHICLE," for example, is used, while a character string "EV=XX" (XX is the evaluation value) including an integer portion of the value obtained by multiplying the evaluation value by 100, a character string "DOWN=Y/N" representing the presence/absence of the downlink information ("Y" if the downlink information is retained, and "N" if not), and a character string "UP=Y/N" representing the presence/absence of the uplink information ("Y" if the uplink information is retained, and "N" if not) can be connected by "&" into a character string, thereby determining the ESSID. In this case, when the evaluation value is 0.80, and the downlink information is retained but the uplink information is not retained, the ESSID is determined as "T-VEHICLE&EV=80&DOWN=Y&UP=N." By reference to the ESSID determined in this manner, it is possible to find out that the access point is the vehicle 10 due to the presence of a predetermined fixed character. The communication opportunity (evaluation value) of this vehicle and the presence/absence of retention of the downlink information and uplink information can also be found out. The ESSID described here is merely an example; thus, the ESSID can be expressed in any specific form as long as it enables understanding of the information.

The wireless communication unit AP transmits a wireless LAN beacon that contains the ESSID determined in a manner described above at predetermined intervals (generally 100 milliseconds). The wireless LAN beacon corresponds to a control frame according to the present invention, and the wireless communication unit AP that transmits this beacon corresponds to the evaluation value transmission unit.

The evaluation value calculation and ESSID determination processes described above are repeated at predetermined intervals. The predetermined intervals may be equal to the duration of the predetermined time period described above, but the predetermined intervals may be longer or shorter than that. When the vehicle travels a predetermined distance from the position of the previous execution of the processes, the processes may be re-executed, and when the vehicle moves away by a predetermined distance from the position of the previous execution of the processes, the processes may be re-executed, and the processes may be re-executed at timing designated by a user.

(3-1. Communication Control Process Executed when Beacon is Received from Another Vehicle)

Figure 6:
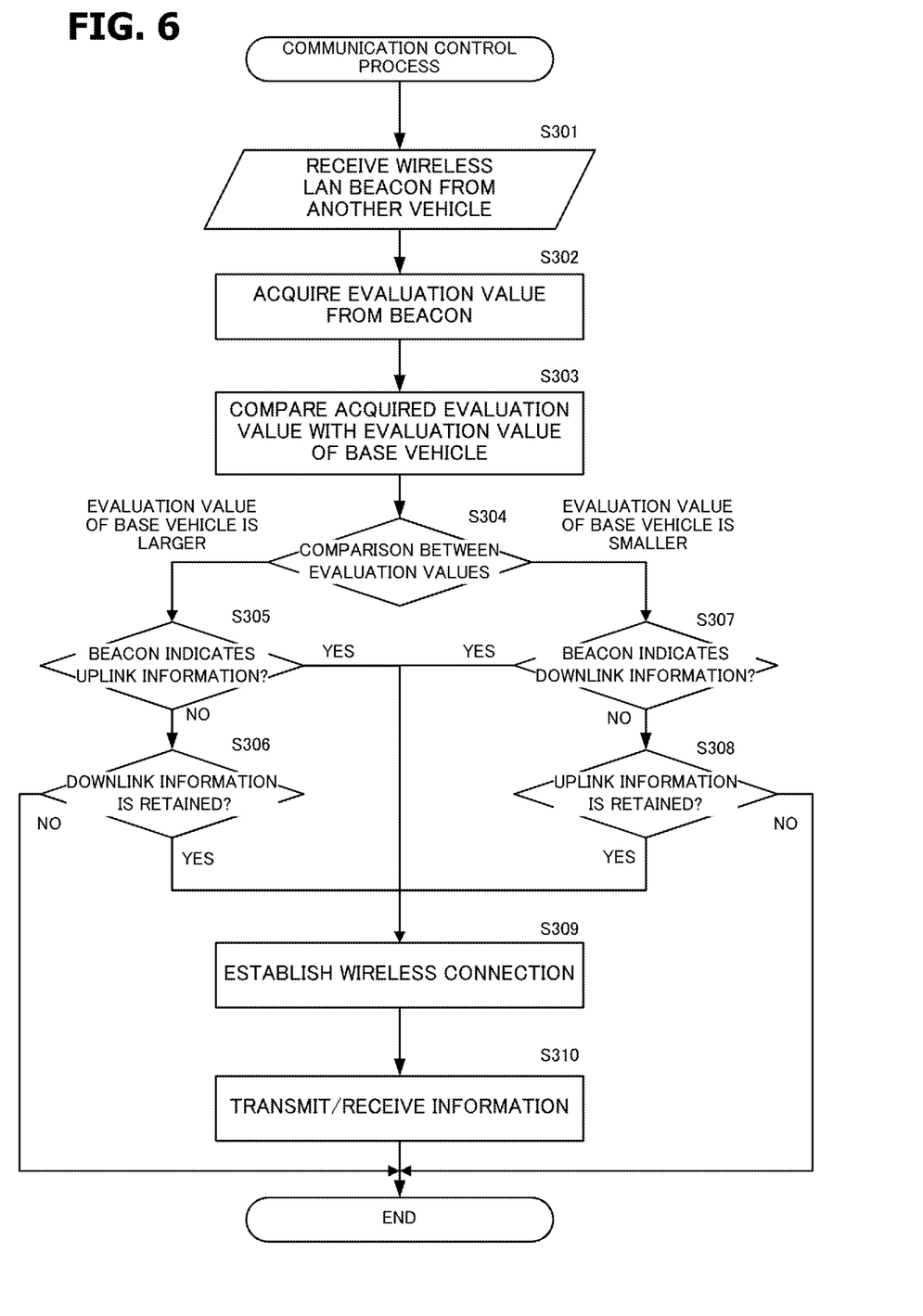
FIG. 6 is a flowchart showing a flow of communication control according to the embodiment.

A communication control process of the vehicle 10 is described hereinafter with reference to the flowchart shown in FIG. 6. FIG. 6 is a flowchart showing a flow of a process executed when a wireless LAN beacon is received from another vehicle.

When the wireless communication unit STA receives a wireless LAN beacon transmitted from another vehicle (S301), the steps subsequent to step S302 are executed. Whether the received wireless LAN beacon is transmitted from another vehicle or not can be determined by referring to the ESSID thereof.

In step S302, the evaluation value acquisition unit 105 acquires an evaluation value of this other vehicle (written as "EVo") from the ESSID included in the wireless LAN beacon received from this other vehicle. In steps S303 and S304, the comparison unit 106 compares the evaluation value EVo acquired in step S302 with an evaluation value (EVs) of the wireless communication device calculated by the evaluation value calculation unit 103, to determine which one is larger.

When the evaluation value EVs of the base vehicle is greater than the evaluation value EVo of the other vehicle, the process proceeds to step S305. In this case, the base vehicle has more opportunities to communicate with the wireless LAN spot 20 (i.e., the opportunities to communicate with the database server 30). Therefore, it is preferred that the base vehicle receives the uplink information from the other vehicle if any, and transmits the downlink information to the other vehicle. In step S305, the communication controller 107 determines whether the received beacon suggests retention of the uplink information. In the present embodiment, it is determined whether a character string "UP=Y" is included in the ESSID or not. In step S306, the communication controller 107 determines whether the downlink information is stored in the information storage unit 108 of the wireless communication device or not.

When the beacon suggests retention of the uplink information (S305—YES) or when the base vehicle retains the downlink information (S306—YES), the process proceeds to step S309 in which the communication controller 107 executes control in such a manner that the wireless communication unit STA establishes a wireless connection to the other vehicle. Then, in step S310, information is transmitted/received to/from the other vehicle. In step S310, it is preferred that the other vehicle be notified of the evaluation value EVs of the base vehicle in order to transmit/receive information or of a request for transmitting the uplink information or the downlink information. Such notification enables determination as to which one of the information items should be transmitted by the other vehicle.

On the other hand, when the beacon does not suggest retention of the uplink information (S305—NO) and the base vehicle does not retain the downlink information (S306—NO), the communication controller 107 ends the process without establishing a wireless connection to the other vehicle.

In step S304 in which the evaluation values are compared with each other, when the evaluation value EVs of the base vehicle is smaller than the evaluation value EVo of the other vehicle, the process proceeds to step S307. In such a case, the base vehicle has less opportunities to communicate with the wireless LAN spot 20 (i.e., opportunities to communicate with the database server 30). Therefore, it is preferred that the base vehicle receives the downlink information from the other vehicle if any, and transmits the uplink information to the other vehicle. In step S307, the communication controller 107 determines whether the received beacon suggests retention of the downlink information. In the present embodiment, it is determined whether a character string "DOWN=Y" is included in the ESSID or not. In step S308, the communication controller 107 determines whether the uplink information is stored in the information storage unit 108 of the wireless communication device or not.

When the beacon suggests retention of the downlink information (S307—YES) or when the base vehicle retains the uplink information (S308—YES), the process proceeds to step S309 in which the communication controller 107 executes control in such a manner that the wireless communication unit STA establishes a wireless connection to the other vehicle. Then, in step S310, information is transmitted/received to/from the other vehicle. In step S310, it is preferred that the other vehicle be notified of the evaluation value EVs of the base vehicle in order to transmit/receive information or of a request for transmitting the uplink information or the downlink information. Such notification enables determination as to which one of the information items should be transmitted by the other vehicle.

On the other hand, when the beacon does not suggest retention of the downlink information (S305—NO) and the base vehicle does not retain the uplink information (S308—

NO), the communication controller 107 ends the process without establishing a wireless connection to the other vehicle.

(3-2. Communication Control Process Executed when Beacon is Received from the Wireless LAN Spot)

The wireless LAN spot 20 is a device capable of communicating with the database server 30 at all times and is therefore considered to be located uppermost stream. In other words, the evaluation value of the wireless LAN spot 20 is considered to be 1.0 (the highest). Thus, when the vehicle 10 receives a beacon from the wireless LAN spot 20, the communication controller 107 may establish a wireless connection at all times, so that the uplink information is transmitted to the server 30 and the downlink information is received from the server 30.

The wireless LAN spot 20 transmits a wireless LAN beacon without including the evaluation value itself in the ESSID, but because the wireless LAN spot 20 transmits an ESSID that enables identification thereof as a wireless LAN spot, it can be considered that the evaluation value is notified by means of the wireless LAN beacon.

When receiving a beacon from the wireless LAN spot based on this understanding, a process similar to the one executed when receiving a beacon from another vehicle (the flowchart shown in FIG. 6) may be executed.

(3-3. Communication Control Process Executed when Wireless Connection is Established from Another Vehicle)

When a wireless connection is established from another vehicle, a notification indicating the evaluation value of this other vehicle or indicating a request for transmitting the downlink information or the uplink information may be received, and then information to be transmitted to this other vehicle may be determined based on this notification.

Operational Examples

Figure 7:
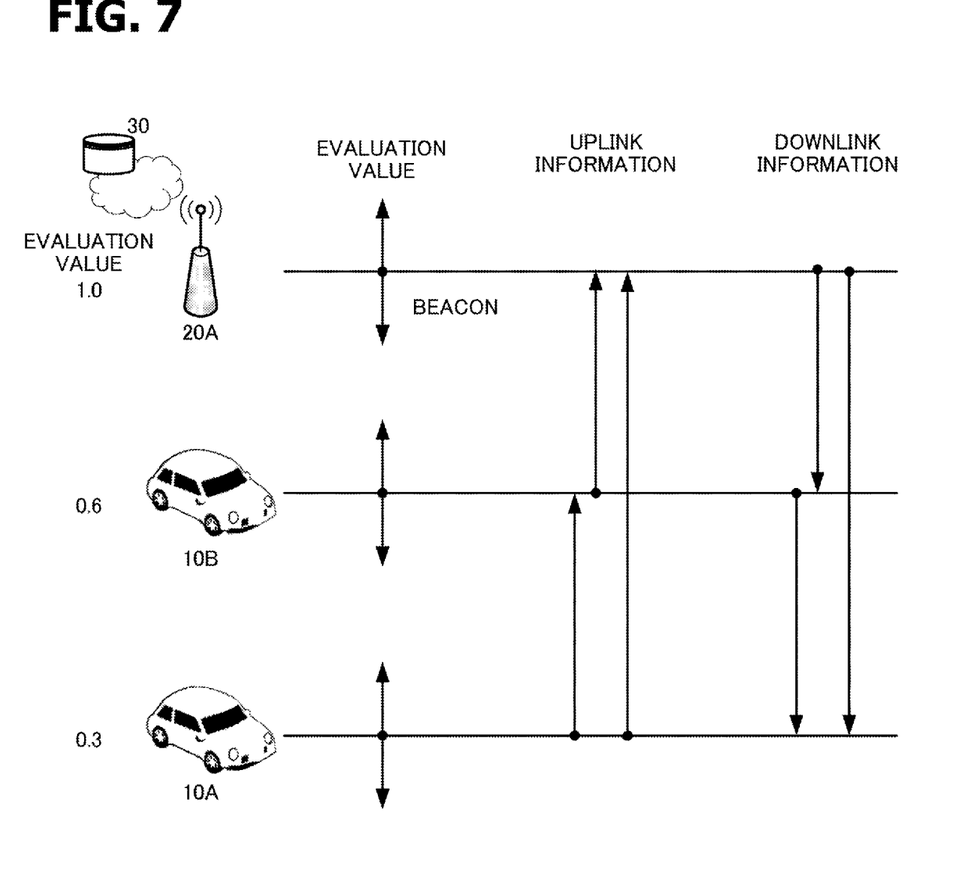
FIG. 7 is a diagram for explaining an information communication direction according to the embodiment.

A flow of information communicated in the present embodiment is described simply with reference to FIG. 7. A flow of information among the vehicle 10A having evaluation value 0.3, the vehicle B having evaluation value 0.6, and the wireless LAN spot 20A (the evaluation value thereof is equivalent to 1.0) is described. All of these devices broadcast wireless LAN beacons thereof that include the evaluation values as a part of their ESSIDs, and thus notify the surrounding devices of the evaluation values. The uplink information is transmitted to the devices of higher evaluation values. When the vehicle 10A finds the vehicle 10B and the wireless LAN spot 20A, the vehicle 10A connects to these devices and transmits the uplink information thereto. When the vehicle 10B finds the wireless LAN spot 20A, the vehicle 10B establishes a connection and transmits the uplink information thereto. The downlink information, on the other hand, is transmitted to the devices of lower evaluation values. When the vehicle 10A finds the wireless LAN spot 20A and the vehicle 10B, the vehicle 10A connects to these devices to receive the downlink information. When the vehicle 10B finds the wireless LAN spot 20, the vehicle 10B establishes a connection to receive the downlink information.

<Advantageous Effects of the Present Embodiment>

According to the present embodiment, which one of the vehicles, a communication partner vehicle and the base vehicle, has more opportunities to communicate with the database server 30 can be determined based on the evaluation values. The uplink information is transmitted to a vehicle having a better communication opportunity, and the downlink information is transmitted to a vehicle having less communication opportunity, thereby enhancing the efficiency of exchanging information. In other words, vehicle-to-vehicle communication can preferentially be executed when the degree of contribution thereof to information propagation within the vehicle network system is high. Due to a short time period in which information can be communicated by vehicle-to-vehicle communication and the limited communication capacity, it is desired that effective information exchange be executed with as low communication traffic as possible. The present embodiment can realize such efficient exchange of information.

Moreover, according to the present embodiment, when executing the communication control, it is only necessary to exchange the evaluation values when vehicles that communicate directly with each other start the communication. For instance, unlike the flooding processes in a conventional ad-hoc wireless network, information does not need to be exchanged in the entire network or with a communication partner device through a plurality of hops, nor is it necessary to be exchanged on a regular basis. Thus, efficient exchange of information can be realized with simple processes.

Furthermore, according to the present embodiment, a wireless LAN beacon includes the evaluation value and the presence/absence of retention of the uplink information/downlink information and is transmitted. Therefore, whether communication is necessary or not can be determined without establishing a wireless connection. Therefore, when communication is not necessary, a wireless connection process can be eliminated, realizing efficient communications.

<Modifications>

(Modification 1. Method for Calculating Communication Opportunity)

A modification of the process for calculating a communication opportunity is now described. In the foregoing explanation, a past beacon reception time period is defined as a communication opportunity (a time period in which communication can be performed with a wireless LAN beacon). However, the communication opportunity may be in a different form as long as the opportunity for the vehicle 10 to be able to communicate with the database server 30 can be evaluated quantitatively.

For example, a time period that is obtained by excluding a time period required to establish a wireless connection from the time period during which the vehicle 10 receives a beacon from the wireless LAN spot 20 may be defined as a communication opportunity. The number of times the vehicle 10 receives a beacon from the wireless LAN spot 20 may also be defined as a communication opportunity. A time period during which the vehicle 10 connects with the wireless LAN spot 20 and then to the database server 30 or the number of times the vehicle 10 connects with the wireless LAN spot 20 and then to the database server 30 may also be defined as a communication opportunity. Furthermore, the amount of data that the vehicle 10 communicates with the database server 30 after connecting with the wireless LAN spot 20 may be defined as a communication opportunity.

(Modification 2. Method for Calculating Evaluation Value)

A modification of the process for calculating the evaluation value is now described. In the foregoing explanation, the evaluation value is calculated based on the communication opportunities during the immediate predetermined time period. However, the communication opportunities depend on the location of the vehicle 10. For instance, when the vehicle 10 is present in an urban area, it is assumed that there are more communication opportunities, but when present in a rural area, it is assumed that there is less communication opportunity. Although lengthening a time period for evaluation value calculation has the advantage that a long-term history can be employed, it has the disadvantage that such a regional difference is absorbed. It is therefore preferred that the evaluation value be calculated in view of the current location of the vehicle 10 as well.

Figure 8:
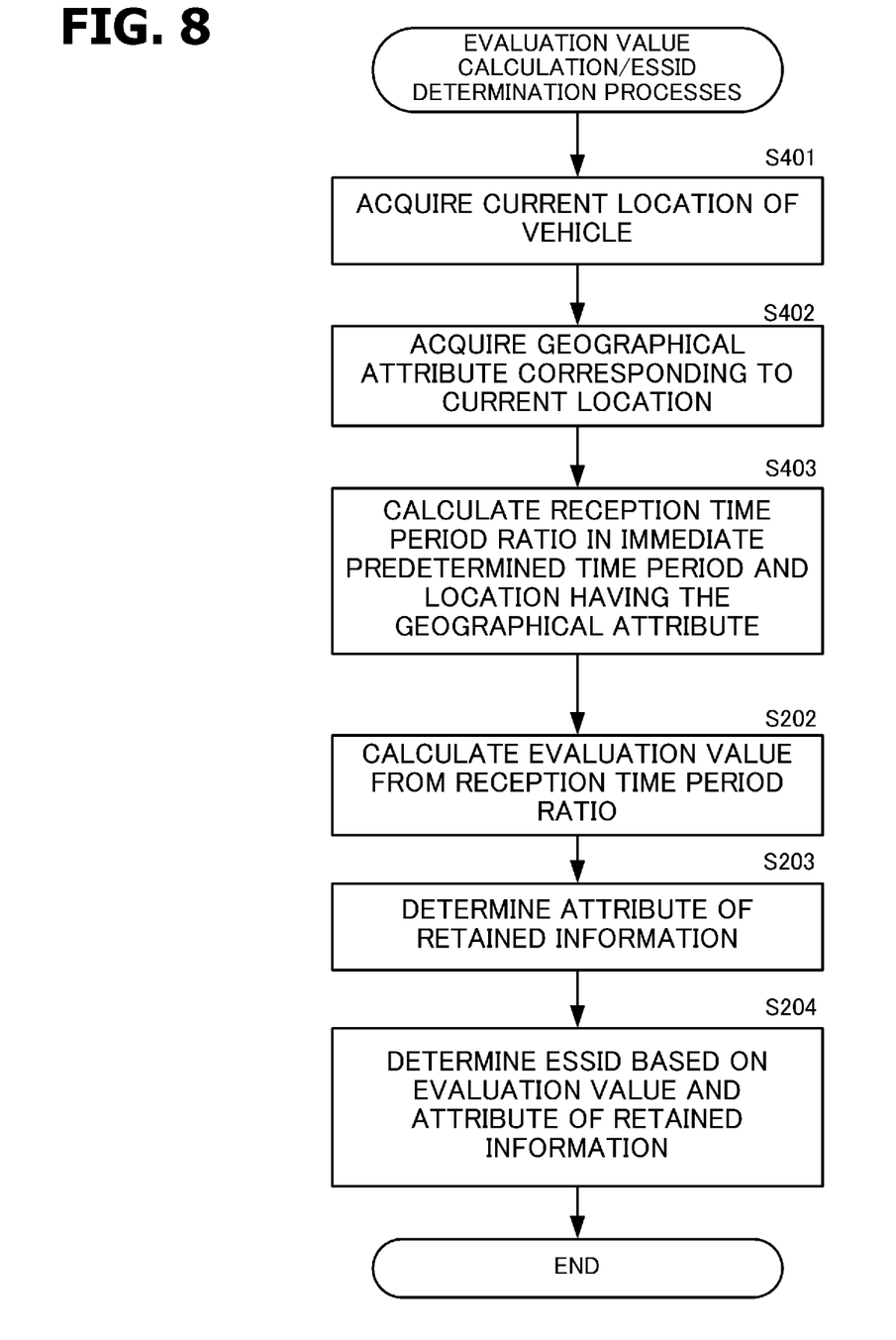
FIG. 8 is a flowchart showing a flow of evaluation value calculation/ESSID determination processes according to a modification.

FIG. 8 shows a flowchart of the evaluation value calculation/ESSID determination processes according to the present modification. The evaluation value calculation unit 103 acquires the current location of the vehicle 10 in step S401, and acquires a geographical attribute corresponding to the current position in step S402. A section based on a geographical region such as a Tokyo area or Kanagawa area, for example, can be employed as the geographical attribute. Alternatively, a section such as an urban area, a suburban area, or a rural area, and a section of a freeway or an open road, can be employed as the geographical attribute. The geographical attribute can take any criteria as long as a location sharing the same geographical attribute is assumed to have approximately the same number of opportunities for communication with the wireless LAN spot 20 and locations with different attributes are assumed to have different numbers of opportunities for communication with the same.

In step S403, the evaluation value calculation unit 103 calculates, based on the communication opportunity history storage unit 102, a beacon reception time period ratio with respect to an immediate predetermined time period (e.g., the past one month) and a location that has the same geographical attribute (e.g., Tokyo area) acquired in step S402. Instead of using the predetermined time period (e.g., the past one month) as the denominator to obtain the ratio, it is preferred to use a time period during which the vehicle stays in a place having the same geographical attribute acquired in step S402 (Tokyo area). The reason is to absorb the difference in the total of the beacon reception time periods that may change depending on the staying time. In order to execute such process, the geographical attribute of a location in which an opportunity for communication with the wireless LAN spot 20 is obtained may be stored, as well as the geographical attribute of the address of the vehicle 10 obtained at each of the past time points.

Figure 5A:
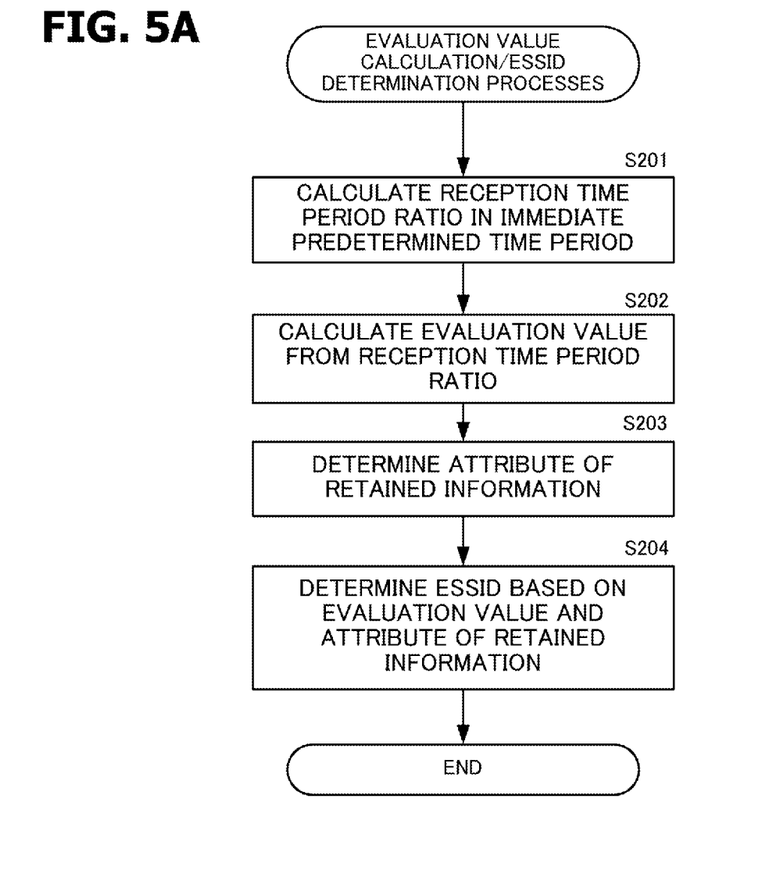
FIG. 5(A) is a flowchart showing a flow of evaluation value calculation/ESSID determination processes according to the embodiment.
Figure 5B:
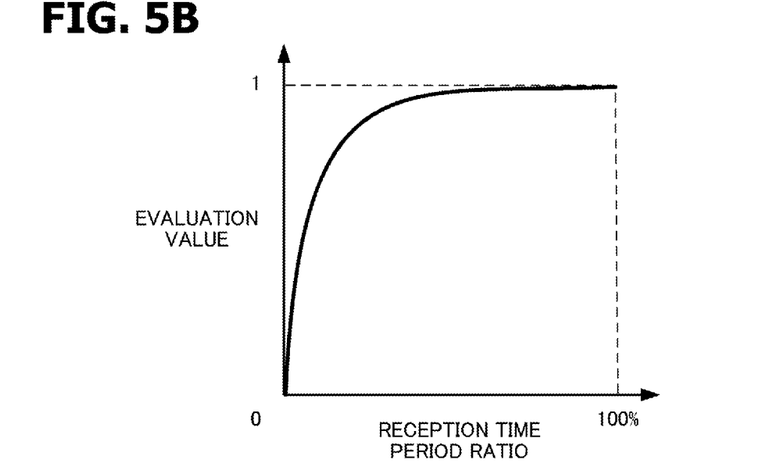
FIG. 5(B) is a graph showing the relationship between a reception time period ratio and an evaluation value.

The ESSID determination process from step S202 to step S204 in the flowchart shown in FIG. 8 is the same as that shown in FIG. 5(A); thus, the explanation thereof is omitted accordingly.

Determining the evaluation value in this manner enables determination of an appropriate evaluation value in accordance with the current location of the vehicle 10.

(Modification 3: Method for Calculating Evaluation Value)

Another modification of the process for calculating the evaluation value is now described. In the foregoing explanation, the evaluation value is calculated based on the past communication opportunities. However, the evaluation value does not have to be determined based on the past histories.

For instance, when a future scheduled movement path of the vehicle 10 is known, its opportunity to communicate with the wireless LAN spot 20 (and the database server 30) during a predetermined time period for the future can be estimated by reference to a map in which the wireless LAN spot 20 is present. Therefore, the same effects as those of the foregoing embodiment can be realized using future communication opportunities.

A path that is set in a car navigation system, for example, can be employed as the scheduled movement path. In a case where a traveling path is determined in advance, such as a bus route, such a path may be employed as the scheduled movement path. For a cab, cargo vehicle, or a business vehicle, the future scheduled movement path may be analogized from the past travel history information. A method for acquiring the scheduled movement path is desired to have high estimation accuracy, but the specific methods thereof are not particularly limited.

The evaluation value may be determined based only on an estimated communication opportunity of a predetermined time period for the future or may be determined based on both the past and future communication opportunities. When determining the evaluation value using the past and future communication opportunities, the evaluation is considered to be determined based on a total of both the past and future communication opportunities. Alternatively, an average value that is obtained by weighting a provisional evaluation value based on the past communication opportunity and a provisional evaluation value based on the future communication opportunity may be determined as the final evaluation value.

(Modification 4. Communication Control Process)

A modification of the communication control process is now described. In the foregoing explanation, the evaluation value is included in a wireless LAN beacon and transmitted. Such a configuration is advantageous in terms of determining the necessity of providing a connection prior to establishing a wireless connection; however, this configuration is not required.

After a connection with a surrounding vehicle is established, the evaluation values of the vehicles may be exchanged, and then information to be transmitted may be determined based on the comparison between the evaluation values. In other words, by selecting the information to be transmitted in such a manner that the downlink information is transmitted from the vehicle having the large evaluation value to the vehicle having the small evaluation value and that the uplink information is transmitted from the vehicle having the small evaluation value to the vehicle having the large evaluation value, efficient communications can be realized.

For example, the evaluation value can be included in subscriber information for notifying information to be provided to a surrounding vehicle or information acquired by the base vehicle, and transmitted. In this system, when the desired information of the surrounding vehicle is the downlink information, it is considered to execute control for transmitting the information only when the evaluation value of the base vehicle is large. In the foregoing embodiment, communication control is implemented based on only whether either the uplink or downlink information is transmitted or on whether the evaluation value is large or small, but use of the subscriber information enables execution of communication control in view of the necessity of the information.

In the foregoing explanation, the evaluation values are compared with each other based simply on the levels thereof, but the evaluation values may be compared based on a different matter. For example, when the evaluation value EVo of the other vehicle is greater than a value obtained by adding a predetermined margin A to the evaluation value EVs of the base vehicle (EVo>EVs+A), it may be determined that the uplink information is transmitted to the other vehicle. The margin value A may be a positive value or a negative value. When the margin value A is a positive value, the effect of preventing the transmission of the information is obtained. When the margin value A is a negative value, the effect of reliable exchange of information can be obtained. Similarly, when the evaluation value EVo of the other vehicle is smaller than a value obtained by subtracting a predetermined margin value B from the evaluation value EVs of the base vehicle (EVo<EVs−B), it may be determined that the downlink information is transmitted to the other vehicle. The margin value B may be a positive value, a negative value, or equal to or different from the margin value A. When the margin value B is a positive value, the effect of preventing the transmission of the information is obtained. When the margin value B is a negative value, the effect of reliable exchange of information can be obtained.

The directions of distribution of the uplink information or the downlink information in the present embodiment do not have to be determined based on the foregoing standards. For instance, the uplink information is preferably transmitted to a vehicle having a large evaluation value, but may be transmitted to a vehicle having a low evaluation value when there is a large communication capacity. On the other hand, the downlink information is preferably transmitted to a vehicle having a low evaluation value, but may be transmitted to a vehicle having a large evaluation value when there is a large communication capacity.

(Other Modifications)

The above has described that the vehicle 10 has two wireless LAN interfaces. However, the vehicle 10 does not have to have two physical wireless LAN interfaces as long as the vehicle 10 can function as both a wireless LAN client and a wireless LAN access point. The two interfaces may be realized by using the functions of WiFi-Direct. In so doing, the functions of both a wireless LAN client and wireless LAN client point can be provided at the same time as long as they are compatible with a concurrent mode.

According to the foregoing explanation, a vehicle with a small evaluation value establishes a connection to a vehicle with a large evaluation value functioning as an access point; however, this may be reversed. In other words, a vehicle with a small evaluation value may function as an access point, and a vehicle with a large evaluation value may establish a wireless connection to the vehicle with a small evaluation value. Which vehicle to use as an access point does not have anything to do with a flow of the information; thus, either one can be employed.

In addition, the same effects can be realized with an ad-hoc mode in place of the infrastructure of a wireless LAN.

According to the foregoing explanation, the evaluation value is included in the ESSID field of a wireless LAN beacon and transmitted. However, the evaluation may be included in another field. For example, when the wireless connection between vehicles is established in compliance with the Hotspot 2.0 standard, subscriber information may be included in a payload of an operator friendly name element of an ANQP Response. In the procedure in the Hotspot 2.0, prior to the establishment of a wireless connection, an access point transmits a beacon, a connecting-side wireless communication device transmits a query (request) in response to the beacon, and then the access point sends replies. One of the replies transmitted from the access point include an operator friendly name element of a 256-octet that can be set at any value. The same effects as those described above can be achieved by including the evaluation value in the element.

The above has described an example in which a wireless LAN is employed as the wireless connection system between the vehicles. However, the wireless connection system is not limited to a wireless LAN, and Bluetooth™, Zigbee™, cellular communications, WiMax and the like can be used. In these wireless communication systems, the wireless communication unit AP (access point) of a vehicle providing a connection transmits a control frame, in which any data can be stored. Therefore, the evaluation value can be included in the control frame transmitted by the wireless communication unit AP, and each of the vehicles can control the distribution direction of the information based on the evaluation value (communication opportunity).

The above has described an example of a wireless communication system configured with in-vehicle terminals, but the specific configurations of the communication system are not limited thereto. For instance, the present invention can be applied to any mobile wireless communication device other than a vehicle. The mobile wireless communication device is a wireless communication device equipped in a vehicle, ship or aircraft, or a wireless communication device that can be carried by a user, such as a notebook computer, slate (tablet) computer, or cellular phones. Further, the communication device does not have to be mobile device; thus, the present invention can be applied to a system configured with fixed wireless communication devices (such as a sensor network). In addition, wireless communications are not required, and the present invention can be applied to a system with wireless and cable communication therein or a system using only cable communications.

REFERENCE SIGNS LIST

10 Vehicle
101 Communication opportunity determination unit
102 Communication opportunity history storage unit
103 Evaluation value calculation unit
104 ESSID determination unit
105 Evaluation value acquisition unit
106 Comparison unit
107 Communication controller
STA Wireless communication unit (wireless LAN client)
AP Wireless communication unit (wireless LAN access point)
20 Wireless LAN spot
30 Database server

The invention claimed is:

1. A wireless communication device comprising:
a wireless communication client configured to (i) perform wireless communication with an access providing device providing access to a predetermined device, and (ii) perform wireless communication with a secondary wireless communication device;
a first memory configured to store an evaluation value calculation program, the evaluation value calculation program being configured to calculate a first evaluation value based on at least an estimation of an opportunity for communication between the wireless communication device and the access providing device in a future predetermined time period;
a second memory configured to store an evaluation value acquisition program, the evaluation value acquisition program being configured to acquire a second evaluation value for the secondary wireless communication device;
a processor configured to (i) read and execute the evaluation value calculation program from the first memory, and (ii) read and execute the evaluation value acquisition program from the second memory;
a communication controller configured to control communication between the wireless communication device and the secondary wireless communication device based on a comparison between the first evaluation value and the second evaluation value.

2. The wireless communication device according to claim 1, wherein when the communication controller makes a determination based on the comparison between the first evaluation value and the second evaluation value that the secondary wireless communication device has more opportunities to communicate with the access providing device than the wireless communication device does, the communication controller implements control such that information directed to the predetermined device is sent to the secondary wireless communication device.

3. The wireless communication device according to claim 1, wherein when the communication controller makes a determination based on the comparison between the first evaluation value and the second evaluation value that the wireless communication device has more opportunities to communicate with the access providing device than the secondary wireless communication device does, the communication controller implements control such that information delivered from the predetermined device is sent to the secondary wireless communication device.

4. The wireless communication device according to claim 1, wherein the evaluation value calculation program is configured to calculate the first evaluation value based on at least (i) a communicable time at which the wireless communication device was able to communicate with the access providing device, (ii) a number of communications with the access providing device, or (iii) an amount of communication data in a past predetermined time period.

5. The wireless communication device according to claim 1, wherein the evaluation value calculation program is configured to calculate the first evaluation value based on at least (i) a communicable time at which the wireless communication device was able to communicate with the access providing device, (ii) a number of communications with the access providing device, or (iii) an amount of communication data in a past predetermined time period in an area corresponding to a current location of the wireless communication device.

6. The wireless communication device according to claim 1, wherein the evaluation value calculation program calculates the first evaluation value based on at least (i) a communicable time at which the wireless communication device can communicate with the access providing device, or (ii) an amount of communication data in a the future predetermined time period estimated based on a scheduled movement path of the wireless communication device.

7. The wireless communication device according to claim 1, further comprising an evaluation value transmission program configured to transmit the first evaluation value calculated by the evaluation value calculation program to the secondary wireless communication device, wherein the evaluation value transmission program is configured to incorporate the first evaluation value into a control frame that notifies surroundings of a presence of the wireless communication device.

8. The wireless communication device according to claim 7, wherein:
a wireless communication system between the wireless communication device and the secondary wireless communication device is a wireless Local Area Network (LAN), and
the evaluation value transmission program incorporates the first evaluation value into an Extended Service Set ID (ESSID) of a beacon.

9. The wireless communication device according to claim 8, wherein when the communication controller makes a determination based on the first evaluation value and the second evaluation value that the secondary wireless communication device has more opportunities to communicate with the access providing device than the wireless communication device does, and the wireless communication device retains information directed to the predetermined device, the communication controller establishes a wireless connection to the secondary wireless communication device and implements control such that the information directed to the predetermined device is sent to the secondary wireless communication device.

10. The wireless communication device according to claim 8, wherein when the communication controller makes a determination based on the comparison between the first evaluation value and the second evaluation value that the wireless communication device has more opportunities to communicate with the access providing device than the secondary wireless device does, the communication controller functions as an access point, and
when the communication controller makes a determination based on the comparison between the first evaluation value and the second evaluation value that the wireless communication device has less opportunity to communicate with the access providing device than the secondary wireless communication device does, the communication controller functions as a station.

11. A non-transitory computer readable storage medium having a program stored therein for a wireless communication device that causes a computer to execute a process for wireless communication between the wireless communication device and an access providing device configured to provide access to a predetermined device, and with a secondary wireless communication device, the process comprising:
calculating a first evaluation value based on at least an estimation of an opportunity for communication between the wireless communication device and the access providing device in a future predetermined time period;
acquiring a second evaluation value for the secondary wireless communication device; and
controlling communication between the wireless communication device and the secondary wireless communication device based on a comparison between the first evaluation value and the second evaluation value.

* * * * *